Patented Nov. 10, 1942

2,301,240

UNITED STATES PATENT OFFICE 2,301,240

PURIFICATION OF ACETYLENE PREPARED BY THERMAL OR ELECTRICAL METHODS

Paul Baumann, Leuna, Heinrich Schilling, Ludwigshafen-on-the-Rhine, and Friedrich Zobel, Leuna, Germany, assignors, by mesne assignments, to Jasco, Incorporated, a corporation of Louisiana No Drawing. Application March 18, 1939, Serial No. 262,730. In Germany March 21, 1938

1 Claim. (Cl. 183—115)

The present invention relates to an improved process for removing impurities from acetylene gas which has been prepared by thermal or electrical methods by washing with organic liquids, as for example oils or tars.

The gas mixtures formed in the preparation of acetylene by thermal or electrical methods are frequently contaminated, as has now been found, not only by diacetylene, allylene, butadiene or like hydrocarbons which are gaseous at ordinary temperature, but also by readily polymerizable constituents of higher boiling point which tend to separate tarry substances.

We have now found that the said polymerizable impurities can be removed from the gas by washing the latter with organic liquids for a longer period than is permissible for the absorption of the said constituents of lower boiling point, that is beyond the time within which the said lower boiling admixtures are completely absorbed. Gas oil, heavy benzine and anthracene oil are examples of very suitable washing liquids.

When working in this way, the lower-boiling constituents are first absorbed by the washing liquid. When the liquid is saturated with these constituents, the higher-boiling, readily polymerizable substances are still absorbed in the further course of the washing process. If finally the absorptive power of the washing liquid for these impurities also subsides, difficultly or non volatile substances will have separated from the liquid, which then can be regenerated by centrifuging and thereby removing the deposited constituents. It has proved preferable continuously to branch off a part of the washing liquid, to separate the deposited constituents from the branched-off portion by centrifuging, and to return the liquid thus purified to the washing container. After a certain time it is necessary to free the washing liquid also from the impurities dissolved therein. This is advantageously effected by distillation whereupon the distillate may be directly used again as washing liquid.

The washing liquid also absorbs a part of the naphthalene contained in the gas mixture, but it soon becomes saturated with this substance so that the proper separation of the naphthalene from the gas should preferably be carried out as a separate step in a known manner after the washing treatment.

After purification from the said higher-boiling polymerizable impurities, the gas may be freed from the lower-boiling impurities, such as diacetylene and the like, by washing with fresh organic liquids according to the specification No. 1,988,032.

The following example will further illustrate the nature of this invention but the invention is not restricted to this example.

*Example*

1800 cubic meters of a gas containing 18 per cent of acetylene which has been obtained by the treatment of pressure hydrogenation waste gases in the electric arc, is freed from the carbon black contained therein and then washed in two consecutive washers at ordinary temperature with 5 cubic meters of gas oil in each washer. 30 per cent of the washing oil used is continuously withdrawn from the washing containers and led into a bowl centrifuge. A pitch-like mass remains in the centrifuge. The oil leaving the centrifuge is returned to the washing container. After working for from 1 to 2 months, the washing oil is distilled with steam and the distillate again used for the gas washing.

What we claim is:

In a process of purifying gases containing acetylene prepared by thermal dissociation of gaseous hydrocarbon products from impurities consisting of unsaturated compounds which are gaseous at ordinary temperature and of readily polymerizable constituents of higher boiling point which tend to form tarry polymerizates the improvement which comprises subjecting the gas to a washing treatment with hydrocarbon oil saturated with said impurities gaseous at ordinary temperature thereby removing readily polymerizable constituents of higher boiling point from the acetylene-containing gases, continuously branching off a part of the washing liquid in the course of the washing treatment, removing the deposited impurities therefrom by centrifuging, and recycling the liquid thus purified for a continued washing treatment.

PAUL BAUMANN.
HEINRICH SCHILLING.
FRIEDRICH ZOBEL.